United States Patent
Wang et al.

(10) Patent No.: US 9,572,192 B2
(45) Date of Patent: Feb. 14, 2017

(54) METHOD AND SYSTEM FOR SUPPORTING INCOMPATIBLE CHANNELIZATION OF A WIRELESS COMMUNICATIONS SYSTEM

(75) Inventors: Chao-Chun Wang, Taipei (TW); Jianhan Liu, San Jose, CA (US); Chih-Shi Yee, Baoshan Township, Hsinchu County (TW); Huanchun Ye, Cupertino, CA (US); James June-Ming Wang, San Marino, CA (US)

(73) Assignee: MEDIATEK SINGAPORE PTE. LTD., Fusionopolis Walk (SG)

( * ) Notice: Subject to any disclaimer, the term of this patent is extended or adjusted under 35 U.S.C. 154(b) by 92 days.

(21) Appl. No.: 13/635,333

(22) PCT Filed: Oct. 18, 2011

(86) PCT No.: PCT/US2011/056607
§ 371 (c)(1),
(2), (4) Date: Sep. 28, 2012

(87) PCT Pub. No.: WO2012/054412
PCT Pub. Date: Apr. 26, 2012

(65) Prior Publication Data
US 2013/0195029 A1 Aug. 1, 2013

Related U.S. Application Data

(60) Provisional application No. 61/394,452, filed on Oct. 19, 2010.

(51) Int. Cl.
*H04W 76/04* (2009.01)
*H04W 28/18* (2009.01)
(Continued)

(52) U.S. Cl.
CPC .............. *H04W 76/04* (2013.01); *H04W 28/18* (2013.01); *H04W 48/08* (2013.01); *H04W 72/00* (2013.01); *H04W 76/02* (2013.01)

(58) Field of Classification Search
CPC ...... H04W 76/04; H04W 28/18; H04W 48/08; H04W 72/00; H04W 76/02
See application file for complete search history.

(56) References Cited

U.S. PATENT DOCUMENTS 6,704,546 B1 * 3/2004 Lucidarme ............ H04W 16/14
455/450
7,656,969 B2    2/2010 Strong
(Continued)

FOREIGN PATENT DOCUMENTS

CN        101138167        3/2008

OTHER PUBLICATIONS

International Search Report and Written Opinion mailed Feb. 13, 2012.

*Primary Examiner* — Walter Divito
(74) *Attorney, Agent, or Firm* — McClure, Qualey & Rodack, LLP

(57) ABSTRACT

A method of supporting incompatible channelization in a wireless communications system is provided. A coordinating device determines a first set of physical parameters of a first wireless channel. The first set of physical parameters includes a channel bandwidth, a central frequency, a transmit power limit, and a modulation and coding scheme. The coordinating device establishes communication with a first set of communications devices over the first wireless channel. The coordinating device then broadcasts a channel-adjustment message and determines a protection period. The channel-adjustment message comprises a set of instructions on how to adjust to a second set of physical parameters of a second wireless channel. A second set of communications devices adjust physical parameters based on the channel-adjustment message. Finally, the coordinating device com- (Continued)

municates with the second set of communications devices over the second wireless channel during the protection period.

25 Claims, 4 Drawing Sheets

(51) Int. Cl.
*H04W 48/08* (2009.01)
*H04W 72/00* (2009.01)
*H04W 76/02* (2009.01)

(56) References Cited

U.S. PATENT DOCUMENTS

| 2007/0270121 | A1  | 11/2007 | Shao |
| 2008/0076439 | A1  | 3/2008  | Cho |
| 2009/0046673 | A1  | 2/2009  | Kaidar |
| 2011/0026623 | A1* | 2/2011  | Srinivasa et al. ............. 375/260 |
| 2011/0292919 | A1* | 12/2011 | Trainin et al. ................ 370/338 |
| 2012/0002630 | A1* | 1/2012  | Bergman ............... H04B 7/061 370/329 |

\* cited by examiner

METHOD AND SYSTEM FOR SUPPORTING INCOMPATIBLE CHANNELIZATION OF A WIRELESS COMMUNICATIONS SYSTEM

CROSS REFERENCE TO RELATED APPLICATIONS

This application is the 35U.S.C. §371 national stage of, and claims priority to and the benefit of, PCT application PCT/US2011056607, filed Oct. 18, 2011, which claims priority to and the benefit of U.S. Provisional Application No. 61/394,452, filed on Oct. 19, 2010, herein incorporated by reference in its entirety.

TECHNICAL FIELD

The disclosed embodiments relate generally to wireless communications systems, and, more particularly, to coexistence between different incompatible channelization in wireless communications systems.

BACKGROUND

One of the factors affecting the design of a wireless communications system is the channelization requirement. It is customary that the requirement of a wireless communications system starts by defining the channelization of the system. Based on the channelization requirement, features are developed to address the characteristics and the requirements of the channel.

The globalization of wireless communications system creates new challenges. One of them is the difference in channelization of a wireless communications system in different countries. For example, in U.S and Europe, IEEE 802.11ac defines UNI 1, 2 and 3 bands for 80 MHz and 160 MHz channels, but in China, only UNI 3 band is currently available for IEEE 802.11ac systems.

The Chinese UNI 3 band is 125 MHz wide and is slightly offset as compared to the US UNI bands. If US channelization is used, a significantly amount of bandwidth will be wasted. As a result, the channel bandwidth for IEEE 802.11ac in China must be wider than the ones defined in the US, etc. The difference in the channel bandwidth creates co-existence and backward compatibility among communications devices operating in different channel bandwidth. The main reason for the incompatibility is the central frequency of the wireless band is shifted with respect to the corresponding channel width. A solution is sought.

SUMMARY

A method of supporting incompatible channelization in a wireless communications system is provided. A coordinating device determines a first set of physical parameters of a first wireless channel. The first set of physical parameters includes a channel bandwidth, a central frequency, a transmit power limit, and a modulation and coding scheme. The coordinating device establishes communication with a first set of communications devices over the first wireless channel. The coordinating device then broadcasts a channel-adjustment message and set up a protection period. The channel-adjustment message comprises a set of instructions on how to adjust to a second set of physical parameters of a second wireless channel. A second set of communications devices adjust physical parameters based on the channel-adjustment message. Finally, the coordinating device communicates with the second set of communications devices over the second wireless channel during the protection period. By controlling and coordinating the transition and timing between the two channel phases, different communications devices with different capabilities are able to coexist in the same wireless system.

In one example, the channel bandwidth of the first channel is 20 MHz or 40 MHz. In another example, the channel bandwidth of the first channel is 80 MHz. The channel bandwidth of the second channel is, in one example, 120 MHz. The channel bandwidth may be determined by availability of the spectrum and interferences. For example, in an Orthogonal Frequency Division Multiplexing (OFDM) system, the channel bandwidth may be multiple non-consecutive spectrum segments. The transmit power limit may be determined according to regional regulation and interferences. In one embodiment, the protection period is set up by using virtual carrier sensing mechanism. In one example, the virtual carrier sensing needs to check the availability of at least 100 MHz.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
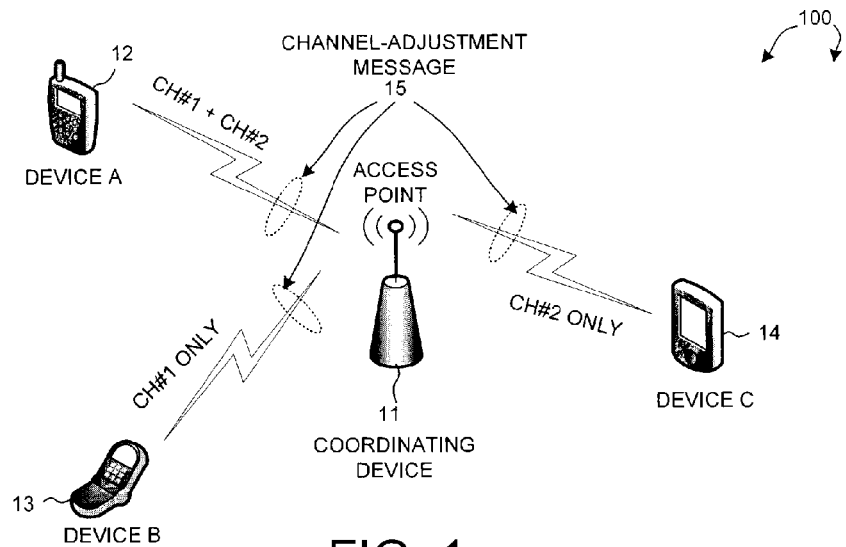
FIG. 1 illustrates a wireless communications system supporting incompatible channelization in accordance with one novel aspect.

FIG. 1 illustrates a wireless communications system 100 supporting incompatible channelization in accordance with a novel aspect. Wireless communications system 100 comprises an access point AP11 (coordinating device), a first mobile station 12 (device A), a second mobile station 13 (device B), and a third mobile station 14 (device C). Device A supports communication over two different wireless communications channels #1 and #2, each is associated with a different set of physical parameters. Device B supports communication over wireless channel #1, and device C supports communication over wireless channel #2. The different physical parameters such as the channel bandwidth and the central frequency of wireless channel #1 and wireless channel #2 create co-existence and compatibility issues. For example, the central frequency of a frequency band may be shifted with respect to the corresponding channel width. As a result, devices A, B, and C would not be able to communicate with each other in the same network.

In one novel aspect, coordinating device AP11 provides a method of providing co-existence and compatibility for communications devices A, B and C that are compliant with a wireless standard but operating in wireless channels of different channel bandwidth and central frequency. In one embodiment, coordinating device AP11 informs and instructs (e.g., via a channel-adjustment message 15) different communications devices to adjust its physical parameters to a different wireless channel at different time instance, such that different communications devices are able to communicate with each other in the same wireless system. For example, device B communicates with device A and the coordinating device over channel #1 during a first time period, while device C communicates with device A and the coordinating device over channel #2 during a second time period.

Figure 2:
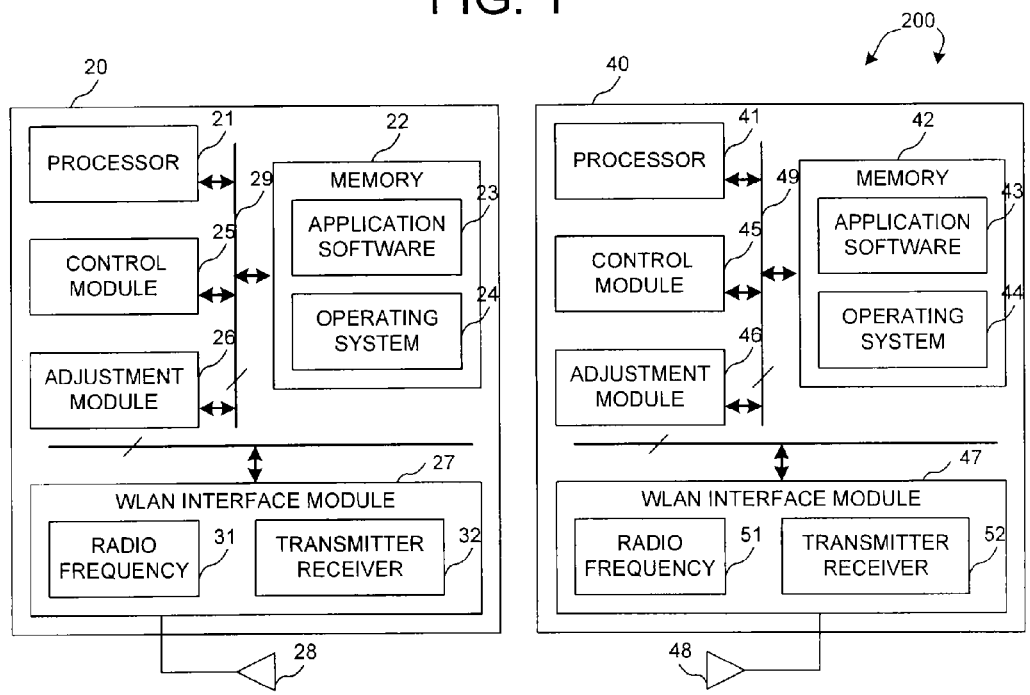
FIG. 2 is a simplified block diagram of an access point and a mobile station in a wireless communications system in accordance with one novel aspect.

FIG. 2 is a simplified block diagram of an access point AP20 and a mobile station STA40 in a wireless communications system 200 in accordance with one novel aspect. Access point AP20 is a coordinating device, and comprises a processor 21, memory 22 that stores an application software module 23 and an operating system module 24, a control module 25, an adjustment module 26, a WLAN (wireless local area network) interface module 27 coupled to an antenna 28, and a data bus 29. WLAN interface module 27 further comprises an RF (radio frequency) module 31 and a transmitter and receiver (transceiver) module 32. Similarly, mobile station STA40 is a communications device, and comprises a processor 41, memory 42 that stores an application software module 43 and an operating system module 44, a control module 45, an adjustment module 46, a WLAN interface module 47 coupled to an antenna 48, and a data bus 49. WLAN interface module 47 further comprises an RF module 51 and a transmitter and receiver (transceiver) module 52.

For coordinating device AP20, processor 21 executes instructions from application software module 23 and operating system module 24 through data bus 29. WLAN interface module 27 enables AP20 to communicate with other communications devices via wireless communications links. In the example of FIG. 2, WLAN interface module 27 is a Wi-Fi interface module that is compliant with certain wireless standards such as IEEE 802.11. Based on the Open System Interconnection (OSI) network model, WLAN interface module 27 typically comprises OSI layer 1 (physical layer) and layer 2 (data link layer) functions, as it provides physical access to a network medium and provides a low-level addressing scheme through the use of MAC addresses. Control module 25 interacts with lower layers and upper layers and performs coordinating and control functions for the entire wireless system. For example, control module 25 determines the physical parameters and phases of the different wireless channels supported in the wireless system. Adjustment module 26 also interacts with both lower layers and upper layers and performs channel adjustment functions. For example, adjustment module determines instructions on how to adjust physical parameters such that a corresponding device can operate in a desired wireless channel.

In the upper layers, operation system module 24 typically includes both an OSI layer 3 (network layer) and layer 4 (transport layer) software modules. For example, operating system module 24 may support the TCP/IP protocol stack. Application software module 23 typically includes applications composed of upper three OSI layers 5, 6 and 7 (presentation, session, and application layer) functions. For example, application software module 23 may support networked applications such as remote login, file transfer, email, web browser, and other asynchronous communications services. For communications device STA40, the different function modules perform similar functionality as compared to coordinating device AP20. STA40, however, may not perform any control and coordinating functions via its control module, while its adjustment module is capable of performing channel adjustment functions based on instructions from the coordinating device.

Figure 3:
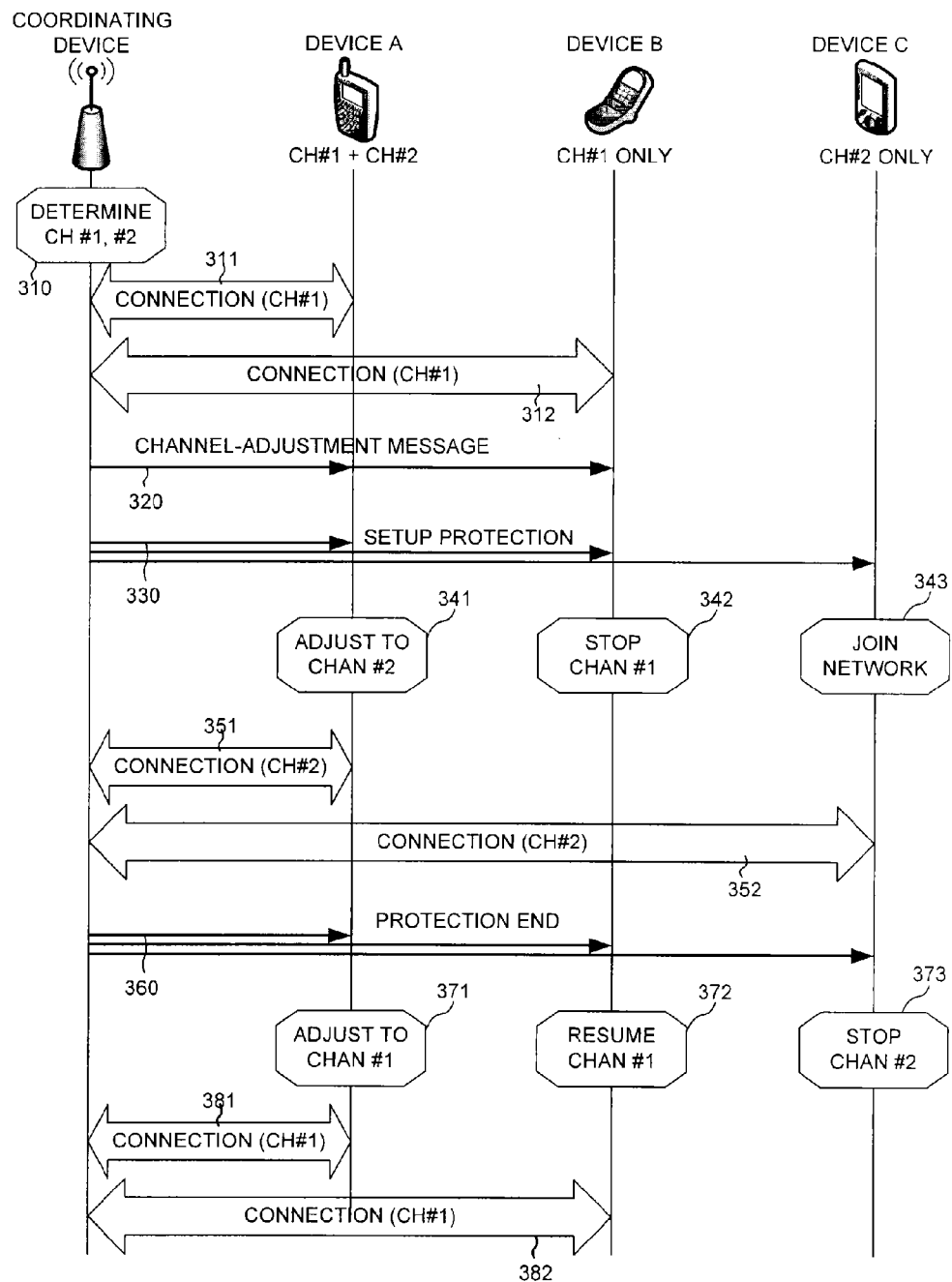
FIG. 3 is a communication and message sequence chart among a coordinating device and other communications devices over different wireless channels.

FIG. 3 is a communication and message sequence chart among a coordinating device and other devices over different channels in a wireless communications system 300. Wireless system 300 comprises a coordinating device and three difference communications devices A, B, and C. Device A supports communication over two different wireless communications channels CH#1 and CH#2, device B supports communication over wireless channel CH#1, and device C supports communication over wireless channel CH#2. Each wireless channel is defined by a set of physical parameters, such as a channel bandwidth, a central frequency, a transmit power limit, a modulation and coding scheme (MCS), and other parameters of the associated channel. The coordinating device determines necessary parameters of the different channels. In addition, the coordinating device acts as a coordinator of the operation of the wireless system such that different communications devices are capable of operating in one or more wireless channels with different parameters.

In step 310, the coordinating device determines necessary parameters of a first channel (CH#1) including channel bandwidth, central frequency, modulation and coding scheme, and even transmit power limit. In a multi-channel system, the coordinating device also determines necessary parameters of a second channel (CH#2) including channel bandwidth, central frequency, modulation and coding scheme, and even transmit power limit. In one example, the channel bandwidth of the first channel is 20 MHz or 40 MHz, which is commonly used in IEEE 802.11n systems. In another example, the channel bandwidth of the first channel is 80 MHz, which is defined for IEEE 802.11ac systems. The channel bandwidth of the second channel is, in one example, 120 MHz. The channel bandwidth may be determined by availability of the spectrum and interferences. For example, in an Orthogonal Frequency Division Multiplexing (OFDM) system, the channel bandwidth may be multiple non-consecutive spectrum segments. The transmit power limit may be determined according to regional regulation and interferences.

Because device A and device B both support operation over the first channel the coordinating device establishes data communication with device A and device B over CH#1 (e.g., in steps 311 and 312). The three devices exchange data frames in accordance with the physical parameters of the first channel. For example, device A may initiate data transfer to device B in a 20 MHz, 40 MHz, or 80 MHz band, or vice versa.

Later, the coordinating device broadcasts a channel-adjustment message to all devices (e.g., devices A and B) operating in the first channel (step 320). The purpose of the channel-adjustment message is to inform devices A and B that there is a second wireless channel available in the same wireless communication system, and to give instruction to devices A and B on how to adjust to a second set of physical parameters such that devices A and B will be able to communicate in the second wireless channel in accordance with a predefined protection period. To accomplish the purpose, channel-adjustment message may include the following information: an exact channel bandwidth, an adjustment (increases or decrease) of channel bandwidth by certain amount, an exact central frequency, an adjustment (shift to left or right) of central frequency by certain amount, an exact power limit, an adjustment (increase or decrease) of power limit by certain amount, a modulation scheme, and a coding rate. For example, if the first channel bandwidth is 80 MHz and the second channel bandwidth is 120 MHz, then the channel-adjustment message may include an instruction to devices A and B to increase channel bandwidth by 40 MHz.

After broadcasting the channel-adjustment message, the coordinating device starts to setup the protection period so that data communication over the second channel will not interfere with data communication over the first channel (step 330). The protection period is determined based on a predetermined rule. In one example, the pre-determined rule is to have equal protection period for operating in the first channel and the second channel. In another example, the pre-determined rule is to set protection period for operating in the first channel and the second channel in accordance with the traffic load over each channel. This step may contain two sub-steps. In a first sub-step, the coordinating device sends out a message to inform devices currently operating in the first channel to stop communication in the first channel. In a second sub-step, the coordinating device sends out another message to inform devices yet to be operating in the second channel to start communication in the second channel during the predefined protection period.

After receiving the channel-adjustment message and the messages during the protection setup stage, different communication devices response differently based on its own device capability. For device A, because it supports communication in both channels, the adjustment module starts to adjust the device A's physical parameters under the instructions provided by the channel-adjustment message. For example, the channel-adjustment message may instruct device A to increase its channel bandwidth by the amount of ΔB, to shift its central frequency to the left by the amount of ΔF, to reduce its transmit power limit by the amount of ΔP, and to use a specific modulation and coding scheme, device A will then adjust its physical parameters accordingly (step 341). After the completion of adjustment, device A starts to exchange data frames with other devices in accordance with the physical parameters of the second channel (step 351).

For Device B, because it only supports communication in the first channel, it has no capability to make any adjustment based on the instructions provided by the channel-adjustment message. Instead, device B stops communication in the first channel after the protection setup stage (step 342). For device C, because it only supports communication in the second channel, it may join the wireless system during the protection period (step 343). For example, after the coordinating device starts to transmit WiFi beacons in the second channel, device C joins the wireless system and starts to exchange data frames with other devices in accordance with the physical parameters of the second channel (step 352).

When the protection period is expiring, the coordinating device starts to end the protection period so that data communication can be resumed in the first channel (step 360). This step may contain two sub-steps. In a first sub-step, the coordinating device sends out a message to inform devices currently communicating over the second channel to stop communication in the second channel. In a second sub-step, the coordinating device sends out another message to inform devices that support the first channel to resume communication in the first channel after the protection duration.

After receiving the messages during the protection end stage, different communications devices respond differently based on its own device capability. For device A, because it supports communication in both channels, the adjustment module starts to adjust the device A's physical parameters to the first set of parameters of channel 1 (step 371). After the completion of adjustment, device A starts to exchange data frames with other devices in accordance with the physical parameters of the first channel (step 381). For device B, because it supports communication in the first channel, it resumes communication in the first channel (step 372). For example, device B starts exchange data frames with other devices in accordance with the physical parameters of the first channel (step 382). For Device C, because it only supports communication in the second channel, it thus stops communication in the second channel after the protection period has expired (step 373).

This process of operating in different wireless channels during different time duration is controlled and coordinated by the coordinating device. Although different communications devices operating in different wireless channels, they are able to coexist in the same wireless system and communicate in the corresponding supported wireless channel. Note that the different channels may not be predetermined in the system. The different channels, instead, may be dynamically determined by the coordinating device based on system environment. For example, the device does not know which channel and its associated physical parameters will be in operation next, but it has the capability to adjust its parameters based on the channel-adjustment message such that it can communicate in accordance with the next channel.

Figure 4:
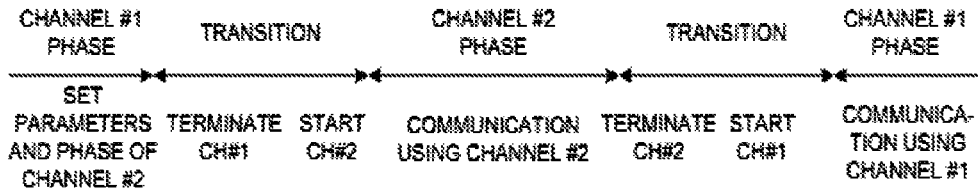
FIG. 4 illustrates one embodiment of supporting incompatible channelization.

FIG. 4 illustrates one embodiment of supporting incompatible channelization in a wireless communications system. The wireless communications system has several phases: a first wireless channel (CH#1) phase, a second wireless channel (CH#2) phase, and a transition phase. The first channel is associated with a first set of physical parameters including a first channel bandwidth, a first central frequency, a first transmit power limit, and a first modulation and coding scheme. The second channel is associated with a second set of physical parameters including a second channel bandwidth, a second central frequency, a second transmit power limit, and a second modulation and coding scheme.

A coordinating device (e.g., an access point) controls and coordinates the transition and timing between the two channel phases. During CH#1 phase, a first set of devices that supports the first channel exchange data frames in accordance with the first set of physical parameters of the first channel. To initiate the transition from CH#1 to CH#2, the coordinating device broadcasts a channel-adjustment message that contains a set of instructions to set up parameters and phase of the second channel. For example, the channel-adjustment message contains information of the second set of parameters of the second channel and instructions on how to change the current parameters to the new parameters. During the transition phase, the coordinating device first transmits a message to terminate communication in CH#1, and then transmits another message to start communication in CH#2 during a protection period.

In one embodiment, the protection period is set up by using virtual carrier sensing mechanism. In one example, the virtual carrier sensing needs to check the availability of at least 100 MHz. Note that the terminating CH#1 message is transmitted over a physical waveform in accordance with the first channel, while the starting CH#2 message is transmitted over a physical waveform in accordance with the second channel. After the transition phase, the system enters CH#2 phase, and a second set of devices that supports the second channel exchange data frames in accordance with the second set of physical parameters of the second channel. After the protection period expires, the system enters another transition phase. During the second transition phase, the coordinating device first transmits a message to terminate communication in CH#2, and then transmits another message to resume communication in CH#1. The same process is then repeated in the wireless system under the control and coordination of the coordinating device.

Figure 5:
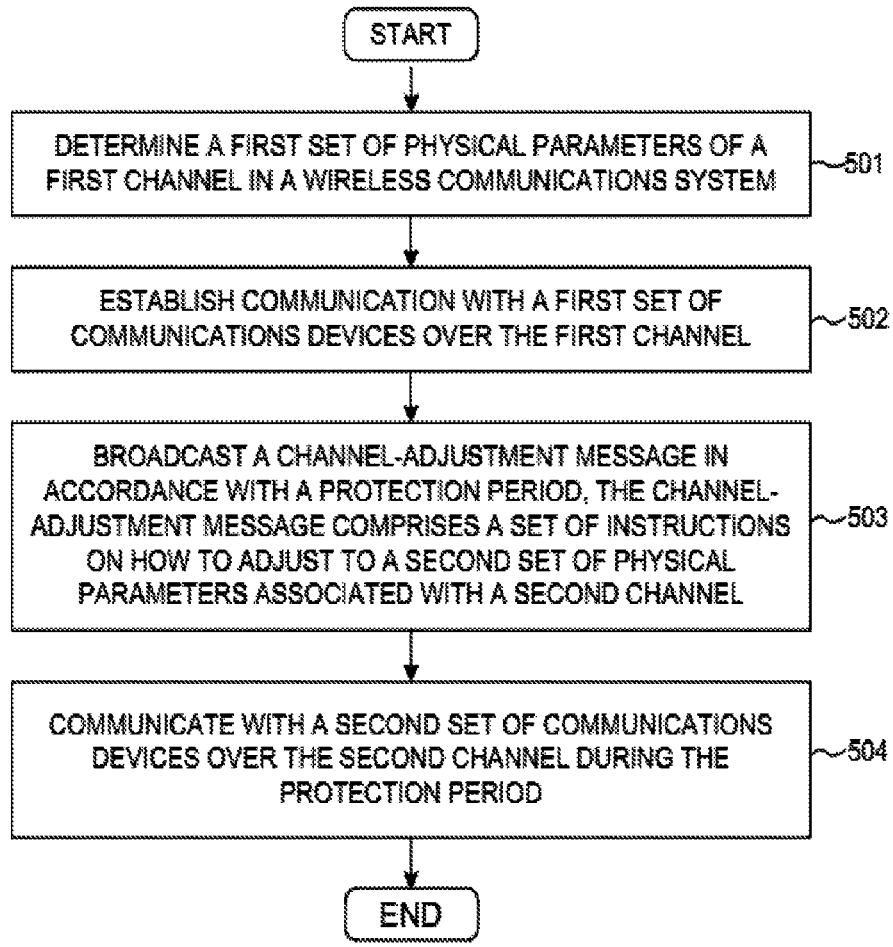
FIG. 5 is a flow chart of a method of supporting incompatible channelization from a coordinating device perspective in accordance with one novel aspect.

FIG. 5 is a flow chart of a method of supporting incompatible channelization from a coordinating device perspective in accordance with one novel aspect. In step 501, a coordinating device determines a first set of physical parameters of a first wireless channel in a wireless communications system. In step 502, the coordinating device establishes communication with a first set of communications devices over the first wireless channel. In step 503, the coordinating device broadcasts a channel-adjustment message and determines a protection period. The channel-adjustment message comprises a set of instructions on how to adjust to a second set of physical parameters of a second wireless channel. In step 504, the coordinating device communicates with a second set of communications devices over the second wireless channel during the protection period.

Figure 6:
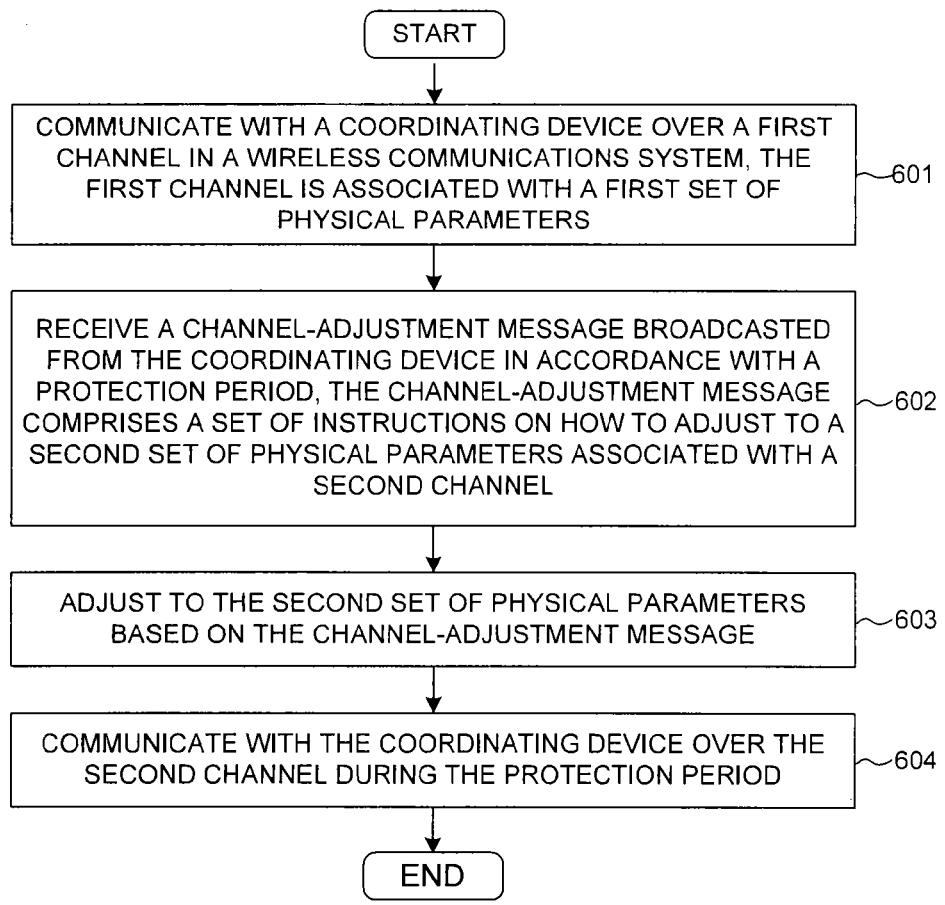
FIG. 6 is a flow chart of a method of supporting incompatible channelization from a mobile station perspective in accordance with one novel aspect.

FIG. 6 is a flow chart of a method of supporting incompatible channelization from a mobile station perspective in accordance with one novel aspect. In step 601, a communications device communicates with a coordinating device over a first wireless channel in a wireless communications system. The first wireless channel is associated with a first set of physical parameters including a channel bandwidth, a central frequency, a transmit power limit, and a modulation and coding scheme. In step 602, the communications device receives a channel-adjustment message broadcasted from the coordinating device. The channel-adjustment message comprises a set of instructions on how to adjust to a second set of physical parameters associated with a second wireless channel before a protection period. In step 603, the communications device adjusts its physical parameters based on the channel-adjustment message. In step 604, the communications device communicates with the coordinating device over the second wireless channel during the protection period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    determining a first set of physical parameters of a first channel by a coordinator in a wireless communication system;
    establishing communication with a first set of devices over the first channel, wherein the whole first channel is used by the first set of devices to transfer data;
    determining a protection period in accordance with a pre-determined rule;
    broadcasting a channel-adjustment message, wherein the channel-adjustment message comprises a set of instructions for indicating how to adjust from the first channel to a second channel, and the set of instructions comprise channel bandwidth information for indicating how to adjust to a bandwidth of the second channel, and central frequency information for indicating how to adjust to a central frequency of the second channel; and
    communicating with a second set of devices over the second channel during the protection period, wherein the whole second channel is used by the second set of devices to transfer data;
    wherein the communication over the first channel and the communication over the second channel during the protection period are compliant with a same communication standard within the same wireless communication system.

2. The method of claim 1, wherein the channel-adjustment message comprises a channel bandwidth or an adjustment to channel bandwidth, a central frequency or an adjustment to central frequency, a power limit or an adjustment to power limit, and a modulation and coding scheme.

3. The method of claim 1, wherein at least one of the first set of devices capable of operating in the second channel adjust physical parameters in accordance with the set of instructions before the beginning of the protection period.

4. The method of claim 1, wherein the pre-determined rule is to have equal protection period for operating in the first channel and the second channel.

5. The method of claim 1, wherein the pre-determined rule is to set protection period for operating in the first channel and the second channel in accordance with the traffic load over each channel.

6. The method of claim 1, wherein at least one of devices of the first set of devices are capable of operating in the first channel and the second channel.

7. The method of claim 1, wherein the first set of physical parameters comprise a first channel bandwidth of 80MHz, and wherein a second set of physical parameters associated with the second channel comprise a second channel bandwidth of 120MHz.

8. The method of claim 1, wherein the channel-adjustment message contains instructions to the first set of devices to adjust to the second channel before the protection period.

9. The method of claim 1, wherein the channel-adjustment message contains instructions to the first set of devices to stop communication during the protection period if the first set of devices does not support the second channel.

10. The method of claim 1, wherein the protection period is established via carrier sensing mechanism, and wherein the carrier sensing mechanism checks the availability of at least 100MHz channel bandwidth.

11. The method of claim 1, further comprising: dynamically determining the channel bandwidth information and the central frequency information based on system environment; wherein the step of broadcasting the channel-adjustment message comprising: broadcasting the channel-adjustment message according to the dynamically determined result.

12. A coordinating device, comprising:
    a processor that determines a first set of physical parameters of a first channel, a second set of physical parameters of a second channel, and determines durations of protection period for the first channel and the second channel in accordance with a pre-determined rule, and adjusts between the first set of physical parameters and the second set of physical parameters; and
    a transceiver that broadcasts a channel-adjustment message, and communicates with a plurality of devices over the first and the second channels, wherein the channel-adjustment message comprises a set of instructions on how to adjust from the first channel to the second channel, and the set of instructions comprise channel bandwidth information for indicating how to adjust to a bandwidth of the second channel and central frequency information for indicating how to adjust to a central frequency of the second channel;

wherein the whole first channel is used by the first set of devices to transfer data, and the whole second channel is used by the second set of devices to transfer data, and the communication over the first channel and the communication over the second channel during the protection period are compliant with a same wireless communication standard within a same wireless communication system.

13. The device of claim 12, wherein the channel-adjustment message comprises a channel bandwidth or an adjustment to channel bandwidth, a central frequency or an adjustment to central frequency, a power limit or an adjustment to power limit, and a modulation and coding scheme.

14. The device of claim 12, wherein the first set of physical parameters comprise a first channel bandwidth of 80MHz, and wherein the second set of physical parameters comprise a second channel bandwidth of 120MHz.

15. The device of claim 12, wherein the channel-adjustment message contains instructions to one or more communication devices to adjust to the second set of physical parameters before the protection period.

16. The device of claim 12, wherein the channel-adjustment message contains instructions to one or more communication devices to stop communication during the protection period if the devices do not support the second channel.

17. The device of claim 12, wherein the protection period is established via carrier sensing mechanism, and wherein the carrier sensing mechanism checks the availability of at least 100MHz channel bandwidth.

18. A method, comprising:
communicating with a coordinating device over a first channel in a wireless communication system, wherein the first channel is associated with a first set of physical parameters;
receiving a channel-adjustment message and information about a protection period broadcasted from the coordinating device, wherein the channel-adjustment message comprises a set of instructions on how to adjust from the first channel to a second channel, and the set of instructions comprise channel bandwidth information for indicating how to adjust to a bandwidth of the second channel and central frequency information for indicating how to adjust to a central frequency of the second channel;
adjusting to the second channel based on the channel-adjustment message before the start of the protection period; and
communicating with the coordinating device over the second channel during the protection period;
wherein the communication over the first channel and the communication over the second channel during the protection period are compliant with a same communication standard within the same wireless communication system.

19. The method of claim 18, wherein the channel-adjustment message comprises a channel bandwidth or an adjustment to channel bandwidth, a central frequency or an adjustment to central frequency, a power limit or an adjustment to power limit, and a modulation and coding scheme.

20. The method of Claim 18, wherein the first channel bandwidth is 80MHz, and wherein the second channel bandwidth is 120MHz.

21. The method of claim 18, wherein the device stops communication during the protection period if the device does not support the second channel.

22. A device, comprising:
a processor that adjusts physical parameters based on a channel-adjustment message, wherein the channel-adjustment message comprises a set of instructions on how to adjust from a first channel to a second channel, and the set of instructions comprise channel bandwidth information for indicating how to adjust to a bandwidth of the second channel and central frequency information for indicating how to adjust to a central frequency of the second channel; and
a transceiver that receives the channel-adjustment message and information about a protection period transmitted from a coordinating device in a wireless system, and communicates with the coordinating device over the first channel before receiving the channel-adjustment message, and communicates with the coordinating device over the second channel during the protection period after receiving the channel-adjustment message if the device supports the second channel;
wherein the communication over the first channel and the communication over the second channel during the protection period are compliant with a same communication standard within a same wireless communication system.

23. The device of claim 22, wherein the channel-adjustment message comprises a channel bandwidth or an adjustment to channel bandwidth, a central frequency or an adjustment to central frequency, a power limit or an adjustment to power limit, and a modulation and coding scheme.

24. The device of Claim 22, wherein the first channel bandwidth is 80MHz, and wherein the second channel bandwidth is 120MHz.

25. The device of claim 22, wherein the device stops communication during the protection period if the device does not support the second channel.

* * * * *